US009291501B2

(12) United States Patent
Robinson et al.

(10) Patent No.: US 9,291,501 B2
(45) Date of Patent: Mar. 22, 2016

(54) HIGH EFFICIENCY MULTI-CHANNEL SPECTROMETER

(75) Inventors: Ian S. Robinson, Redondo Beach, CA (US); Eric M. Moskun, Long Beach, CA (US); Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 148 days.

(21) Appl. No.: 13/558,785

(22) Filed: Jul. 26, 2012

(65) Prior Publication Data

US 2014/0071449 A1    Mar. 13, 2014

(51) Int. Cl.
*G01J 3/28*  (2006.01)
*G01J 3/18*  (2006.01)
*G01J 3/02*  (2006.01)
*G01J 3/36*  (2006.01)

(52) U.S. Cl.
CPC ............... *G01J 3/18* (2013.01); *G01J 3/0291* (2013.01); *G01J 3/0294* (2013.01); *G01J 3/2823* (2013.01); *G01J 3/36* (2013.01)

(58) Field of Classification Search
CPC ...................................... G01J 3/28; G01J 4/00
USPC ........................................................ 356/328
See application file for complete search history.

(56) References Cited

U.S. PATENT DOCUMENTS

| 5,260,767 | A | 11/1993 | Cook |
| 6,122,051 | A | 9/2000 | Ansley et al. |
| 7,382,498 | B1* | 6/2008 | Cook ............................ 356/328 |
| 7,703,932 | B2 | 4/2010 | Cook |
| 2005/0018189 | A1* | 1/2005 | Hampton et al. ............. 356/369 |
| 2007/0019194 | A1 | 1/2007 | Chen et al. |
| 2008/0309936 | A1 | 12/2008 | Krapu |
| 2009/0009762 | A1* | 1/2009 | Holota et al. .................. 356/328 |
| 2012/0081706 | A1* | 4/2012 | Cook et al. .................... 356/328 |

FOREIGN PATENT DOCUMENTS

JP      2010-506154 A      2/2010

* cited by examiner

*Primary Examiner* — Jamil Ahmed
(74) *Attorney, Agent, or Firm* — Lando & Anastasi, LLP (57) ABSTRACT

A multi-channel imaging spectrometer and method of use thereof. One example of the multi-channel imaging spectrometer includes a single entrance slit, a double pass reflective triplet and at least a pair of diffraction gratings. The spectrometer is configured to receive and collimate an input beam from the entrance slit, to split the collimated beam into two spectral sub-bands using a beamsplitter, and to direct each sub-band to one of the pair of diffraction gratings. The diffraction gratings are each configured to disperse the received portion of the collimated beam into its constituent colors, and redirect the dispersed outputs through the reflective triplet to be imaged into an image sensor located at a focal plane aligned with the entrance slit.

16 Claims, 9 Drawing Sheets

HIGH EFFICIENCY MULTI-CHANNEL SPECTROMETER

BACKGROUND

Imaging spectrometers that form high resolution images in a wide range of spectral bands are used in scientific, military and remote-sensing applications. Imaging spectrometers are used to provide an image and also a spectral analysis of the image in a selected wavelength band of interest. The spectrometer may image electromagnetic radiation that is passed through one or more slits onto one or more image sensors assembled at a focal plane of the spectrometer optics. In some spectrometers, such as double-pass spectrometers, the slits and the image sensors may be positioned adjacent one another at the focal plane.

One example of a spectrometer that is widely used for remote sensing applications is the Offner spectrometer. The Offner spectrometer form has a concentric structure that includes a slit, two concave minors and a diffraction grating disposed on a convex mirror positioned between the two concave mirrors. The Offner spectrometer provides very low distortion with few optical elements over small fields of view. However, the size of the structure becomes extremely large as the field of view increases. In addition, multiple spectrometers, each configured to cover a separate spectral band, as needed to cover wide wavelength ranges or separate spectral regions. As a result, these systems typically have large size, weight and power requirements due to multiple spectrometer optics and multiple image sensors.

U.S. Pat. No. 5,260,767, which is incorporated herein by reference in its entirety, describes examples of an all-reflective imaging spectrometer that uses a double pass reflective triplet form. The spectrometer includes a three-mirror anastigmat acting as its objective and a reflective triplet with a dispersive element providing the spectrometer collimator and imager. U.S. Pat. No. 6,122,051, incorporated herein by reference in its entirety, describes a single-band, multi-slit spectrometer that uses a two-dimensional detector array to enable simultaneous spectral analysis of several objects. Examples of a dual-band, dual-slit imaging spectrometer are described in U.S. Pat. No. 7,382,498, which is incorporated herein by reference in its entirety. According to U.S. Pat. No. 7,382,498, a two-channel spectrometer has a shared objective and a pair of slits at a common image plane. Each of the slits receives a portion of the output beam of the shared objective and is optimized for transmitting different wavelengths. A shared double-pass reflective triplet receives the output beams of the slits. The output of the reflective triplet is incident upon a beamsplitter, which sends a collimated first reflective triplet output of a first wavelength to a first dispersive element, and a collimated second reflective triplet output of a second wavelength to a second dispersive element. The outputs of the dispersive elements are directed back to the beamsplitter and the reflective triplet to imaging detectors positioned at two different locations of the common image plane.

SUMMARY OF INVENTION

Aspects and embodiments are directed to providing an imaging spectrometer with high signal to noise ratio over a broad spectral band with linear dispersion.

According to one embodiment, a multi-channel imaging spectrometer comprises a double pass reflective triplet optical subsystem configured to receive and collimate incident electromagnetic radiation and to provide a collimated output beam, at least one entrance slit configured to direct the incident electromagnetic radiation to the reflective triplet, at least one beamsplitter configured to receive the collimated output beam from the reflective triplet and to separate the collimated output beam into a plurality of spectral channels, and at least two dispersive elements, each configured to receive and spectrally disperse a respective one of the plurality of spectral channels, the number of dispersive elements providing a corresponding number of dispersed outputs, wherein the reflective triplet is further configured to focus the plurality of dispersed outputs onto at least one focal plane co-located with the at least one entrance slit to produce an image from the plurality of dispersed outputs, and wherein the number of dispersive elements exceeds the number of focal planes.

In one example the reflective triplet includes a primary objective minor of positive optical power configured to receive the incident electromagnetic radiation from the entrance slit and to focus the first and second dispersed outputs onto the focal plane, a secondary objective minor of negative optical power optically coupled to the primary objective mirror, and a tertiary objective minor of positive optical power optically coupled to the secondary objective minor and to the at least one beamsplitter. The multi-channel imaging spectrometer may further comprise an image sensor positioned at the at least one focal plane and optically coupled to the double-pass reflective triplet.

In one example of the multi-channel imaging spectrometer, the plurality of spectral channels includes at least three spectral channels, the at least one beamsplitter includes a first beamsplitter optically coupled to the reflective triplet and configured to separate the collimated output beam into a first spectral channel and a remaining wavelength range, and a second beamsplitter optically coupled to the first beamsplitter and configured to separate the remaining wavelength range into a second spectral channel and a third spectral channel, and wherein the at least two dispersive elements includes a first dispersive element configured to receive and spectrally disperse the first spectral channel, a second dispersive element configured to receive and spectrally disperse the second spectral channel, and a third dispersive element configured to receive and spectrally disperse the third spectral channel. In one example the first, second and third dispersive elements are diffraction gratings. In another example the at least one entrance slit includes a first entrance slit and a second entrance slit, and the at least one focal plane includes a first focal plane aligned with the first entrance slit and a second focal plane aligned with the second entrance slit. In another example the multi-channel imaging spectrometer further comprises a third beamsplitter optically coupled to the second beamsplitter and configured to receive and separate the third spectral channel to provide a fourth spectral channel, and a fourth dispersive element configured to receive and spectrally disperse the fourth spectral channel.

According to another example of the multi-channel imaging spectrometer, the at least one entrance slit includes a first entrance slit configured to direct a first wavelength range of the incident electromagnetic radiation to the reflective triplet, and a second entrance slit configured to direct a second wavelength range of the incident electromagnetic radiation to the reflective triplet. In one example the plurality of spectral channels includes four spectral channels, the at least one beamsplitter includes three beamsplitters optically coupled together and configured to separate the collimated output beam into the four spectral channels, the at least two dispersive elements includes four diffraction gratings each configured to receive and spectrally disperse one of the four spectral channels, and the at least one focal plane includes a first focal plane aligned with the first entrance slit and a second focal plane aligned with the second entrance slit. In another example the at least one entrance slit further includes at least one of a third entrance slit and a fourth entrance slit. In a further example, the plurality of spectral channels includes three spectral channels, the at least one beamsplitter includes a first beamsplitter optically coupled to the reflective triplet and configured to separate the collimated output beam into a first spectral channel and a remaining wavelength range, and a second beamsplitter optically coupled to the first beamsplitter and configured to separate the remaining wavelength range into a second spectral channel and a third spectral channel, the at least two dispersive elements includes a first dispersive element configured to receive and spectrally disperse the first spectral channel, a second dispersive element configured to receive and spectrally disperse the second spectral channel, and a third dispersive element configured to receive and spectrally disperse the third spectral channel, and the at least one focal plane includes a first focal plane aligned with the first entrance slit and a second focal plane aligned with the second entrance slit.

According to another embodiment, a multi-channel imaging spectrometer comprises a double pass reflective triplet configured to receive and collimate incident electromagnetic radiation in a spectral band of interest and to provide a collimated output beam, a single entrance slit configured to direct the incident electromagnetic radiation to the reflective triplet, a beamsplitter configured to receive the collimated output beam from the reflective triplet and to separate the collimated output beam into at least a first sub-band and a second sub-band, a first dispersive element configured to receive and spectrally disperse the first sub-band to provide a first dispersed output, and a second dispersive element configured to receive and spectrally disperse the second sub-band to provide a second dispersed output, the reflective triplet further configured to focus the first and second dispersed outputs onto a focal plane co-located with the entrance slit to produce an image from the first and second dispersed outputs.

In one example the reflective triplet includes a primary objective mirror of positive optical power configured to receive the incident electromagnetic radiation from the entrance slit and to focus the first and second dispersed outputs onto the focal plane, a secondary objective minor of negative optical power optically coupled to the primary objective mirror, and a tertiary objective minor of positive optical power optically coupled to the secondary objective minor and to the beamsplitter. The multi-channel imaging spectrometer may further comprise an image sensor positioned at the focal plane and optically coupled to the double-pass reflective triplet. In one example the image sensor is a single focal plane array detector having a first active area sensitive to the first dispersed output and a second active area sensitive to the second dispersed output. The first and second active areas may be spatially separated from one another by a guard band. In one example the spectral band of interest includes a wavelength range of approximately 0.4 µm to 2.5 µm. The multi-channel imaging spectrometer may further comprise a fold minor optically positioned between the beamsplitter and the second dispersive element and configured to direct the second sub-band from the beamsplitter to the second dispersive element. In one example the first and second dispersive elements are first and second diffraction gratings, each with a single blaze angle.

According to another embodiment, a spectroscopy method comprises acts of directing electromagnetic radiation in a spectral band of interest through an entrance slit to a reflective optical system, collimating the electromagnetic radiation using the reflective optical system to provide a collimated output beam, spectrally splitting the collimated output beam into a first sub-band and a second sub-band, spectrally dispersing the first sub-band using a first reflective dispersive element to provide a first dispersed output, spectrally dispersing the second sub-band using a second reflective dispersive element to provide a second dispersed output, and focusing the first and second dispersed outputs via the reflective optical system onto a focal plane co-located with the entrance slit using the reflective optical system to produce an image at the focal plane from the first and second dispersed outputs.

In one example, spectrally splitting the collimated output beam into the first sub-band and the second sub-band is achieved using a beamsplitter, and the method may further comprise recombining the first and second dispersed outputs using the beamsplitter. In another example the method further comprises imaging the first and second dispersed outputs onto an image sensor positioned at the focal plane to produce the image.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a compact multi-band imaging spectrometer, and to the use of a single such spectrometer to cover multiple spectral regions. In particular, certain aspects and embodiments provide a dual-band imaging spectrometer that uses a single entrance slit, a single image sensor (e.g., a focal plane array imaging detector), and shared optics with multiple dispersive elements, such as multiple diffraction gratings or prisms, as discussed further below. Various embodiments may provide a solution to a long felt need in the art of imaging spectrometers, namely to achieve a very high signal to noise ratio without using multiple spectrometers in one system.

Conventional approaches to providing an imaging spectrometer with high signal to noise ratio have included the use of a prism as the dispersive element. Prisms have non-linear dispersion, requiring many more focal plane pixels and a larger spectrometer field of view to cover a given spectral band with a specified spectral resolution. Other approaches for multi-band detection have included using a multi-band spectrometer with multiple entrance slits to spatially separate the different spectral bands. For example, as discussed above, one approach includes the dual-band, dual slit spectrometer described in U.S. Pat. No. 7,382,498. However, this approach requires a second slit, blocking filters on the respective slits to pass a selected wavelength region and block that passed by the other slit, and a relatively large spectrometer field of view to accommodate the spacing from slit to slit, image sensor to each slit, and an optional second image sensor.

In contrast, aspects and embodiments are directed to a compact multi-band imaging spectrometer in which different diffraction gratings are used to offset different spectral regions over the image sensor. In one embodiment, a single entrance slit may be used to provide spatial co-registration of the spectra from all spectral bands, and avoid band-to-band mis-registration. However, in other embodiments, multiple entrance slits may be used, as discussed further below. Embodiments of the imaging spectrometer disclosed herein may provide significantly higher signal to noise ratio than a comparable single grating spectrometer, and are much smaller and better spectrally aligned compared to systems that use two spectrometers to accomplish dual-band imaging. In addition, embodiments of the imaging spectrometer may retain the benefits of the reflective triplet form in field of view. As a result, embodiments of the imaging spectrometer may provide better performance than a conventional Offner or Dyson form at the same F-number, and may have comparable throughput to a prism-based design, but with the linear dispersion of the diffraction gratings. In addition, the imaging spectrometer may have much smaller field of view requirements to cover the same spectral region compared with a prism-based design.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1A:
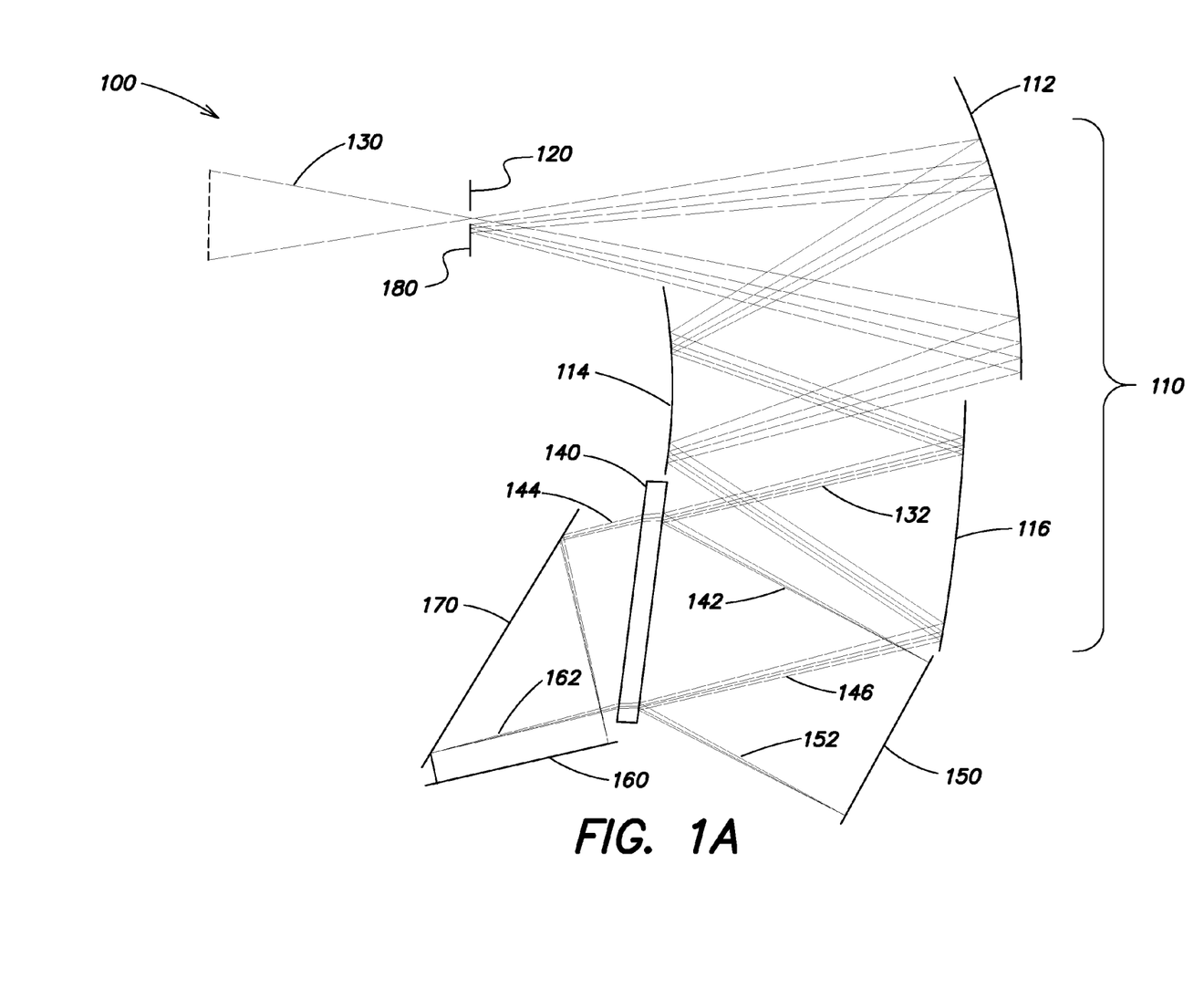
FIG. 1A is a ray trace of one example of an imaging spectrometer according to aspects of the invention.

Referring to FIG. 1A, there is illustrated a ray trace of one example of an imaging spectrometer 100. The spectrometer 100 includes optical elements to perform spectrometer functions for collimation, dispersion, and imaging, as discussed further below. According to one embodiment, a single, compact multi-band imaging spectrometer system 100 provides coverage of multiple spectral bands. In one example, the multiple spectral bands include visible and infrared bands, such as the VNIR-SWIR (e.g., 0.5 to 2.5 µm), MWIR (e.g., 3.3 to 3.5 µm) and LWIR (e.g., 7.7 to 8.2 µm) bands, optionally as well as at least a portion of the visible band (e.g., 0.39 to 0.75 µm). According to one embodiment, the imaging spectrometer 100 includes a double pass reflective triplet 110 and uses a single entrance slit 120 that transmits electromagnetic radiation 130 to the triplet optics. Foreoptics (not shown) may be used to focus and direct the electromagnetic radiation 130 through the entrance slit 120. After the electromagnetic radiation 130 passes through the reflective triplet 110, it is incident upon a dichroic beamsplitter 140 which reflects part of the spectrum to a first reflective dispersive element 150 and transmits the remainder of the spectrum to a second reflective dispersive element 160. The dispersive elements 150, 160 disperse the incoming electromagnetic radiation into its constituent colors or wavelengths. In one example, the dispersive elements 150, 160 are diffraction gratings. In another example, the dispersive elements 150, 160 are prisms. A fold mirror 170 may be used to redirect the electromagnetic radiation to the second reflective dispersive element 160 to achieve a compact structure. The electromagnetic radiation is recombined by the beamsplitter 140 and passes back through the reflective triplet 110, and is imaged onto a focal plane 180 co-located with the entrance slit 120.

According to one embodiment the imaging spectrometer 100 uses the reflective triplet 110 as its objective. An example of a reflective triplet 110 is disclosed in U.S. Pat. No. 7,382, 498. In the example illustrated in FIG. 1, the reflective triplet 110 includes a primary minor 112 having a positive optical power, a secondary minor 114 having a negative optical power, and a tertiary minor 116 having a positive optical power. The three minors of the reflective triplet 110 serve as the collimating optical form for the spectrometer 100. The sum of the optical powers of the primary minor 112, secondary mirror 114, and tertiary minor 116 may be approximately zero, thereby satisfying the zero-Petzval sum or flat field condition.

The three mirrors 112, 114, 116 of the reflective triplet 110 collimate the incoming electromagnetic radiation received via the entrance slit 120 and provide a collimated reflective triplet output beam 132 at the dichroic beamsplitter 140. As discussed above, the beamsplitter 140 separates the collimated reflective triplet output beam 132 into a first reflective triplet output beam 142 having a first wavelength, and a second reflective triplet output beam 144 having a second wavelength. As used herein, the term "wavelength" or "channel" may refer to a single discrete wavelength or to a wavelength range. The first dispersive element 150 receives the first reflective triplet output beam 142 of the first wavelength and produces a first dispersed output 152. Similarly, the second dispersive element 160 receives the second reflective triplet output beam 144 of the second wavelength and produces a second dispersed output 162. As discussed above, the beamsplitter 140 receives and recombines the first and second dispersed outputs 152, 162 from the dispersive elements, and directs the dispersed electromagnetic radiation 146 back through the double-pass reflective triplet 110 to be incident on the focal plane 180. Thus, the reflective triplet 110 of the spectrometer 100 is referred to as a "double-pass" optical component because the electromagnetic radiation travels through the reflective triplet 110, is collimated on the way to the dispersive elements 150, 160, and then, on the return path, travels back through the reflective triplet and is imaged on the focal plane 180.

Figure 1B:
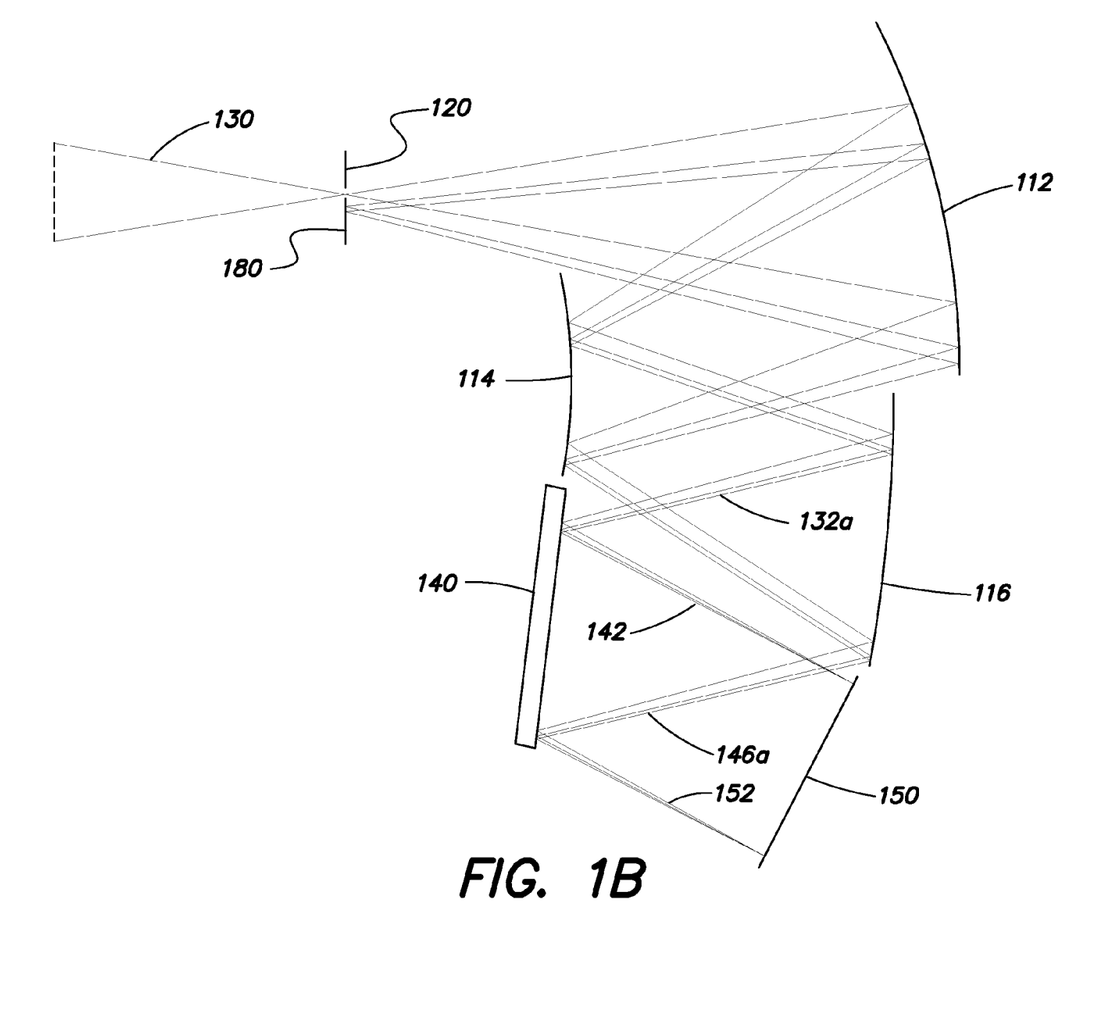
FIG. 1B is a ray trace illustrating only a first channel of the imaging spectrometer of FIG. 1A.
Figure 1C:
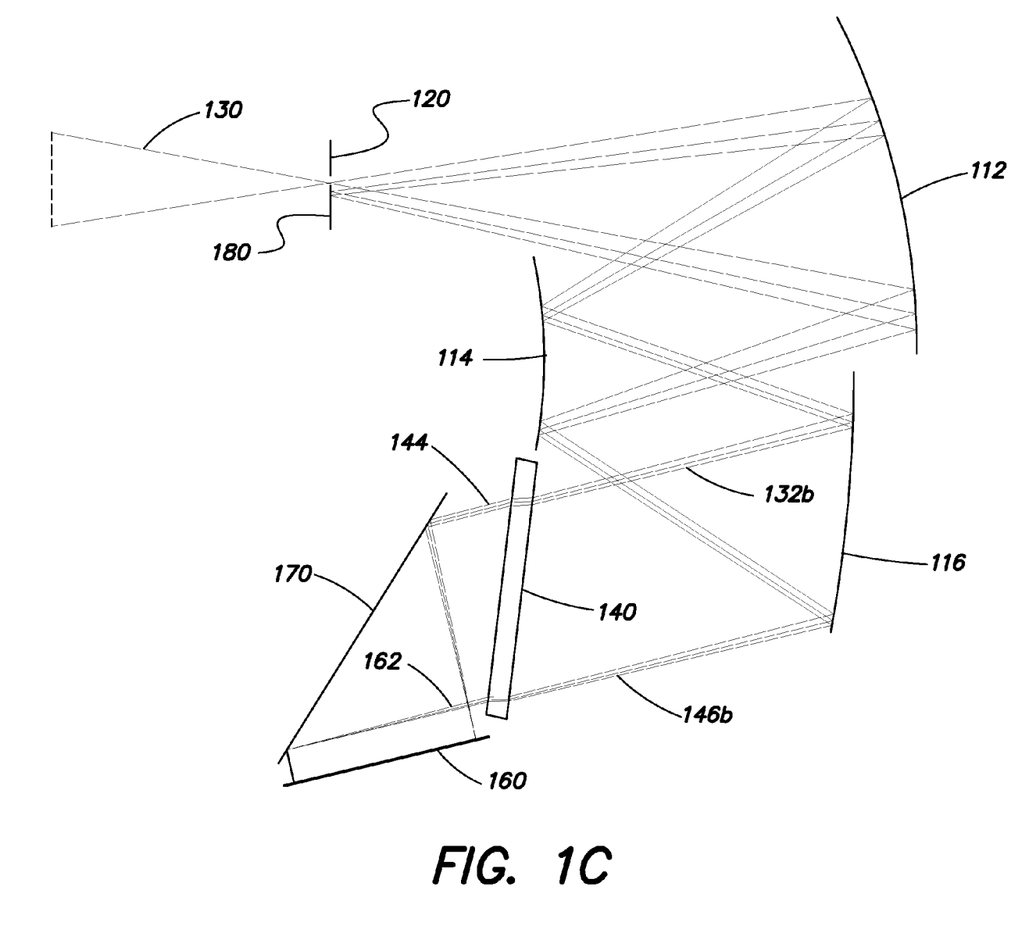
FIG. 1C is a ray trace illustrating only a second channel of the imaging spectrometer of FIG. 1A.

FIG. 1B is a ray trace illustrating the optical path of the first channel of the imaging spectrometer 100. In FIG. 1B, optical beam 132a corresponds to the first wavelength range of the collimated reflective triplet output beam 132 of FIG. 1A, and optical beam 146a corresponds to the first wavelength range of the dispersed electromagnetic radiation 146 of FIG. 1A. FIG. 1C is a ray trace illustrating the optical path of the second channel of the imaging spectrometer 100. In FIG. 1C, optical beam 132b corresponds to the second wavelength range of the collimated reflective triplet output beam 132 of FIG. 1A, and optical beam 146b corresponds to the second wavelength range of the dispersed electromagnetic radiation 146 of FIG. 1A.

According to one embodiment, an image sensor or imaging detector is located at the focal plane 180. By using multiple dispersive elements, multiple spectral bands may be imaged onto a single image sensor located at the focal plane 180. The image sensor may be a panchromatic imaging detector. In one example, detector includes a single focal plane array, which includes one or more photo-detectors and associated read-out integrated circuitry. A focal plane array is composed of two parts, namely the detector and the read-out integrated circuit (ROIC). The detector includes the light-sensitive material that receives light and generates an electrical current. The ROIC is the electronic circuit that captures the current during an exposure and then transfers the signal to other electronics (e.g. for storage). The focal plane array may include any combination of detector materials and/or ROICs to support particular spectral bands of interest.

Figure 2:
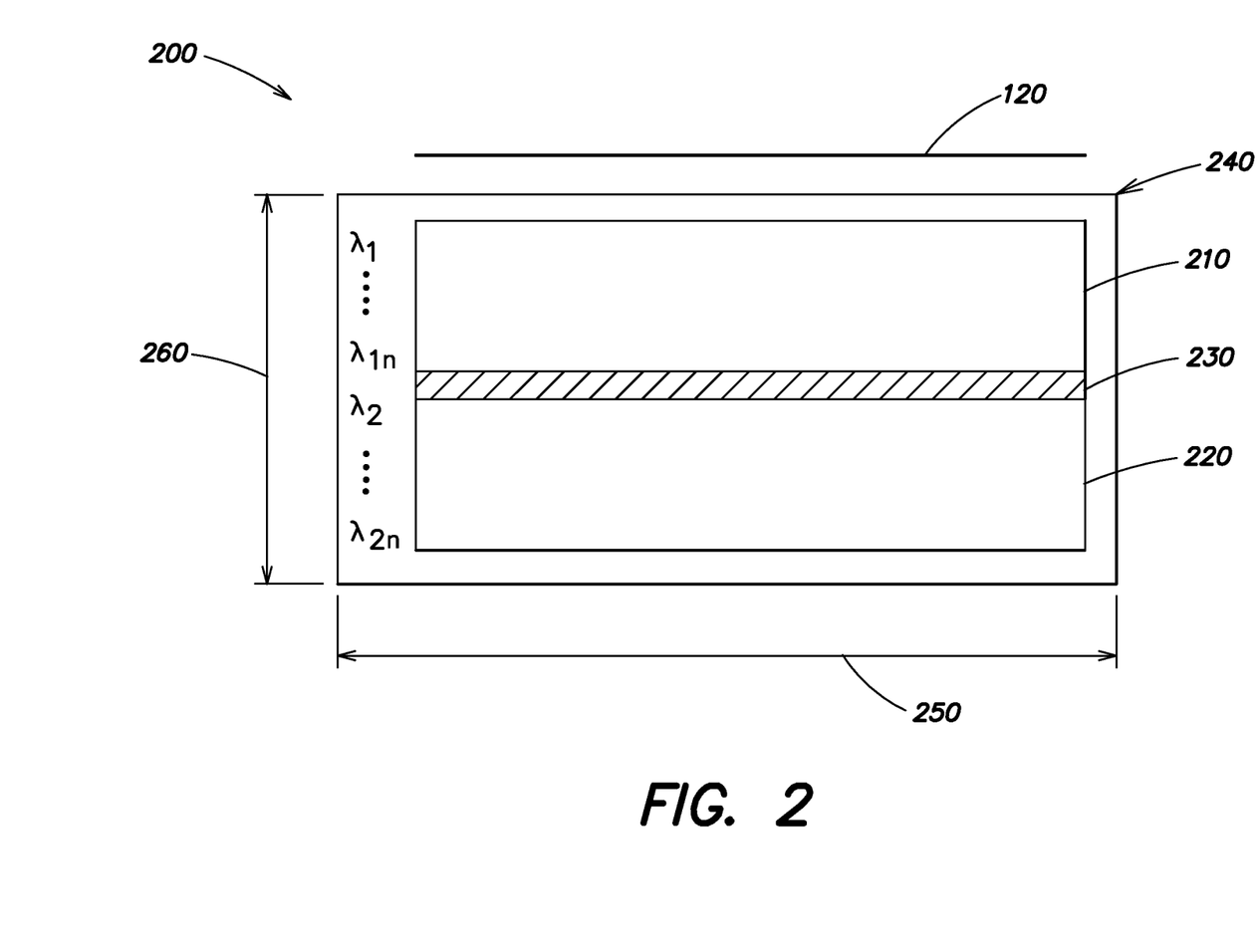
FIG. 2 is a diagram of one example of an imaging detector for use in combination with the imaging spectrometer of FIG. 1, according to aspects of the invention.

Referring to FIG. 2, in one embodiment, a single focal plane array image sensor 200 collects the electromagnetic radiation from each grating. The image sensor 200 may be positioned on and elongated along a first axis that extends parallel to the slit 120. In the illustrated example, the focal plane array 200 includes a first active area 210 sensitive to electromagnetic radiation of the first wavelength (received from the first dispersive element 150) and a second active area 220 sensitive to electromagnetic of the second wavelength (received from the second dispersive element 160). The first and second active areas 210, 220 may be separated from one another by a small "guard band" 230. The active regions and guard band may be arranged on or within focal plane array packaging 240. In one embodiment, the first and second dispersive elements 150, 160 are aligned so that their respective dispersed regions are separated by the guard band 230 on the focal plane array image sensor 200.

For spectroscopic purposes, the image sensor 200 may be generally rectangular, as shown in FIG. 2, having a spatial dimension 250 aligned along the axis parallel to the slit 120, and a spectral dimension 260. The image sensor 200 may be elongated in the spatial dimension 250. The first and second active areas 210 and 220 of the image sensor 200 may each include a plurality of photo-detector elements arranged in an array along the spatial and spectral dimensions 250, 260. The guard band may include a plurality of inactive detectors. The active regions may be configured, and optionally optimized, for selected wavelengths. For example, the first active region 210 may be sensitive to wavelengths ($\lambda_1$-$\lambda_{1n}$) in a range of about 0.4 to 1.4 µm, and the second active region 220 may be sensitive to wavelengths ($\lambda_2$-$\lambda_{2n}$) in a range of about 1.4 µm to 2.5 µm. The construction and configuration of the image sensor 200 may vary across different embodiments. For example, in one embodiment, the image sensor 200 may be mercury cadmium telluride based. In other examples the image sensor 200 may be based on other materials, such as but not limited to indium, antimonide, silicon, indium gallium arsenide, etc. The size of the image sensor 200 may depend on numerous factors, including, for example, the size of the individual detectors (or pixels), pixel density, etc.

According to one embodiment, the spectrometer 100 is configured to operate over the VNIR-SWIR spectral band (approximately 0.4 to 2.5 µm, as in the example above). This is a frequently sensed spectral region. The single entrance slit 120 may accept VNIR-SWIR electromagnetic radiation with no need to reject other colors. As discussed above, all the electromagnetic radiation may pass through a single set of collimating reflective triplet optics 110, and then be separated into component spectral regions (sub-bands) by the dichroic beamsplitter 140. In one embodiment, the dichroic beamsplitter 140 is centered at approximately 1.4 µm, which is a strong atmospheric absorption band. In one embodiment, each sub-band of the electromagnetic radiation (142, 144) is transmitted to a single-blaze reflective diffraction grating (150, 160). The selected peak efficiency of each grating may be near the peak of each blaze of the respective grating.

In conventional single grating spectrometer systems, the grating efficiency is severely reduced when extended by more than one octave. In contrast, according to one embodiment in which the dispersive elements 150 and 160 are diffraction gratings, the efficiency of each grating may be almost double the efficiency of a single double-blazed grating (on average) over the VNIR-SWIR spectral region. In one example, each diffraction grating may have a higher peak efficiency than a single dual-blazed grating, for example, approximately 95% compared to 69%, and greatly reduced roll-off away from the peak efficiency over the sub-band. This efficiency is comparable with systems that use two separate spectrometers to cover the VNIR/SWIR spectral region.

Figure 3:
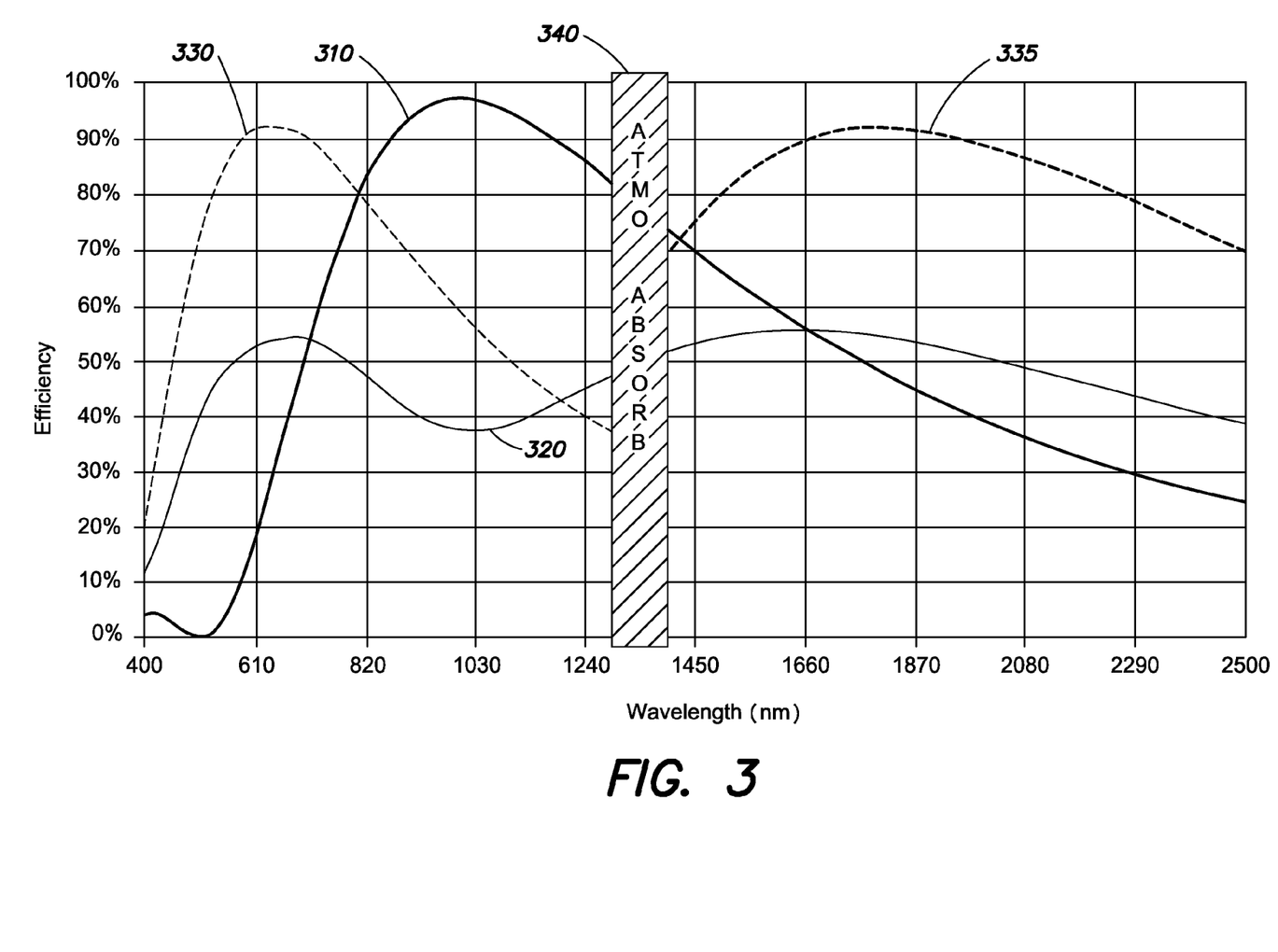
FIG. 3 is a graph of grating diffraction efficiency as a function of wavelength (in nanometers)

For example, referring to FIG. 3 there is illustrated a graph showing the relative throughput (efficiency) of spectrometers with various grating configurations. In FIG. 3, trace 310 represents the efficiency of a single grating system and trace 320 represents the efficiency of a system having a single grating with dual blaze angles. As can be seen with reference to FIG. 3, the single grating system has relatively high efficiency over a narrow spectral range, but relatively poor efficiency at other wavelengths. The dual-blaze angle system has a more even efficiency over a wide spectral range, but the overall relative efficiency is low. Traces 330 and 335 represent the efficiency for a two-grating spectrometer system according to one embodiment. As discussed above, the "overlap" region of the two gratings (or split in the beamsplitter) may be located at approximately 1.4 µm, which is a region of strong atmospheric absorption (represented in FIG. 3 by band 340) and therefore not typically used for spectroscopy. Since the efficiency of each grating may be individually tuned and optimized, the overall efficiency may be relatively high over a wide spectral range, as discussed above. For example, in one embodiment, the average grating efficiency may be increased by approximately 80-120%, since each grating may be individually optimized for its sub-band. Thus, the efficiency may be "spread" over the wavelength ranges for each grating, rather than being limited to a relatively narrow band, as is the case for a single grating system (as shown by trace 310).

In addition, the ability to increase the efficiency and individually tune the gratings may lead to a significantly greater signal to noise ratio. For example, the resulting spectrum, using the two grating construction of certain embodiments, may have a 40-60% higher signal to noise ratio than a conventional single-grating spectrometer. In addition the dispersion of each grating may be selected to optimize the spectral resolution over the ensemble band.

Figure 4:
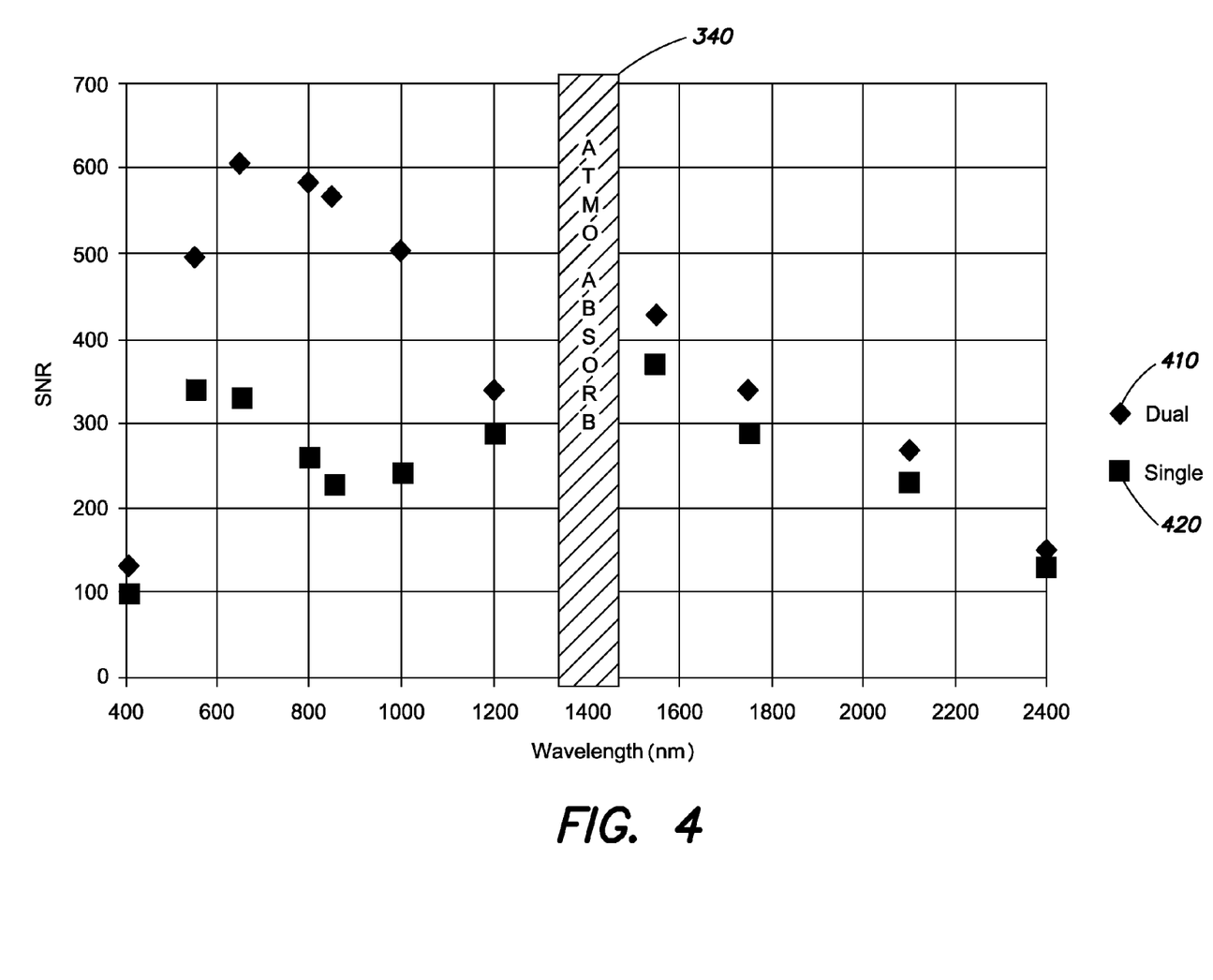
FIG. 4 is a graph of signal to noise ratio (SNR) as a function of wavelength (in nanometers)

Referring to FIG. 4, there is illustrated a graph of signal to noise ratio (SNR) as a function of wavelength in nanometers (nm) for a dual grating spectrometer according to one embodiment and a conventional single (dual blaze) grating spectrometer. Table 1 below contains the corresponding data illustrated in FIG. 4. For the dual grating spectrometer, the dual grating is split at 1.4 μm, as discussed above. In FIG. 4, data points 410 correspond to the example of a dual grating spectrometer, and data points 420 correspond to the conventional single grating (dual blaze) spectrometer.

TABLE 1

| Wavelength (nm) | Dual grating spectrometer SNR | Single grating (dual blaze) spectrometer SNR | Ratio |
| --- | --- | --- | --- |
| 400 | 130 | 100 | 1.3 |
| 550 | 500 | 340 | 1.5 |
| 650 | 610 | 330 | 1.8 |
| 810 | 590 | 260 | 2.3 |
| 850 | 570 | 230 | 2.5 |
| 990 | 507 | 240 | 2.1 |
| 1220 | 339 | 290 | 1.2 |
| 1550 | 430 | 370 | 1.2 |
| 1760 | 340 | 290 | 1.2 |
| 2100 | 270 | 230 | 1.2 |
| 2400 | 150 | 130 | 1.2 |
| Average | 391 | 246 | 1.6 |

The data presented in Table 1 and FIG. 4 illustrates that the average signal to noise ratio may be improved over a conventional single grating spectrometer by an average of approximately 160% over the VNIR-SWIR spectral region.

According to one embodiment the spectrometer 100 is tunable in a variety of parameters. For example, the spectral location of the "split" between wavelength ranges reflected and transmitted by the beamsplitter 140 to the different gratings may be optimized. The number of wavelengths in each sub-band, and in examples where the dispersive elements are diffraction gratings the spectral peak of the grating efficiency for each grating may also be tuned. Additionally, the blaze angle of each grating may be tuned to weight the signal to noise ratio in selected spectral bands. The degree of this tuning capability may be far greater than that of a single grating system, since each of the separate gratings (e.g., 150 and 160) may be individually tuned and optimized.

Thus, aspects and embodiments may provide a compact, tunable, efficient, two or more channel imaging spectrometer that may provide numerous benefits or advantages over conventional imaging spectrometer systems. As discussed above, embodiments of a dual-grating spectrometer may provide greatly increased signal to noise ratio compared with conventional single-grating spectrometer systems. In other examples, the dual-grating spectrometer may provide the same or similar signal to noise ratio as a comparable single-grating spectrometer, but with greatly reduced ground sample distance (GSD) or faster data frame rates. Additionally, due to the ability to use a single entrance slit for multiple channels, embodiments of the spectrometer may have a much smaller field of view (yet cover the same spectral region) than other multi-channel spectrometers, such as that disclosed in U.S. Pat. No. 7,382,498, or systems that must accommodate a prism disperser, which has non-linear dispersion. In some examples, due to its non-linear dispersion, a prism-based spectrometer may require approximately 50-100% more image sensor pixels along the spectral dimension of the image sensor than embodiments of the dual-grating spectrometer, which is costly in hardware and data rate and requires a larger field of view.

Thus, aspects and embodiments may provide significant cost savings and other design advantages over conventional spectrometers, including the fabrication of only one slit for a dual-band device, rather than two or more slits, and a larger useful field of view area, resulting in a smaller overall field of view. For example, dual-slit designs may need more than 100% more effective field of view to accommodate slit to slit spacing and slit to image sensor spacing, and even more if separate image sensors are used for each slit and channel. In addition, dual-slit designs may require coatings on the slit substrate such that each slit accepts the wavelengths of its designed spectral band and rejects the wavelengths of the other spectral bands. In contrast, for a single-slit dual grating spectrometer according to certain embodiments, the slit accommodates all wavelengths, thereby removing the need for coatings in some examples.

Although the above discussed examples have referred primarily to a two-channel spectrometer including two dispersive elements 150, 160, embodiments of the spectrometer may be extended to N dispersive elements (N being a positive integer) to provide multi-band (or multi-channel) spectroscopy. For example, referring to FIG. 5A, there is illustrated a ray trace of one example of a three channel imaging spectrometer 500 that includes a second beamsplitter 510 and a third dispersive element 530. As for the dispersive elements 150, 160, the third dispersive element 530 may be a diffraction grating or prism, for example. The second beamsplitter 510 separates the electromagnetic radiation 520 passed by the first beamsplitter 140 into a second channel 512, directed to the second dispersive element 160, and a third channel 514 directed to the third dispersive element 530. As discussed above, the dispersive elements 150, 160 and 530 disperse the electromagnetic radiation in their respective channels or wavelengths to produce first, second and third dispersed outputs, respectively. The dispersed outputs are recombined by the beamsplitters 510 and 140 on the return path, and the dispersed electromagnetic radiation is directed back through the double-pass reflective triplet 110 to be incident on the focal plane 180, as discussed above. FIG. 5B illustrates a corresponding ray trace for the third channel only.

Figure 5A:
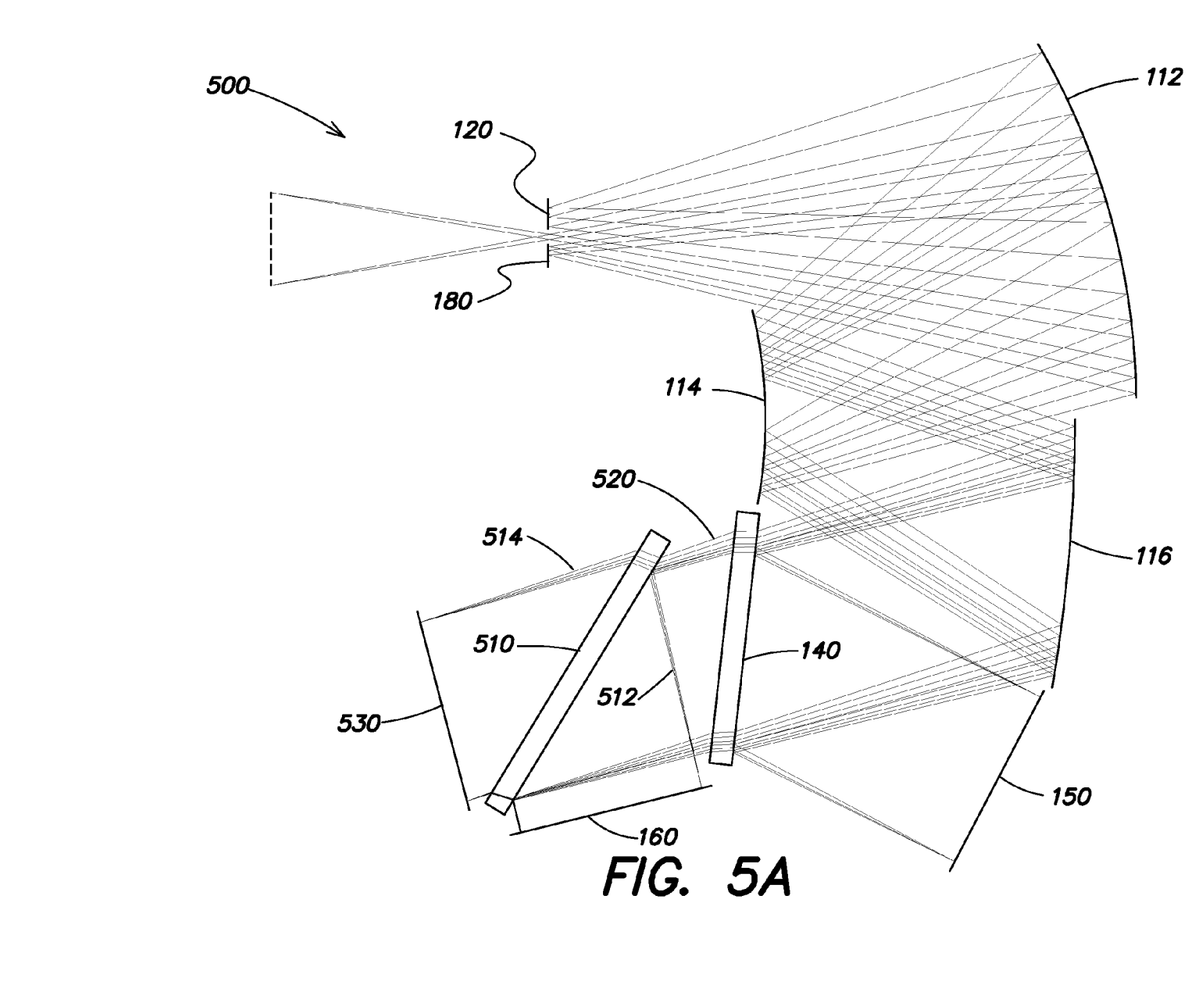
FIG. 5A is a ray trace of one example of a three channel imaging spectrometer according to aspects of the invention.
Figure 5B:
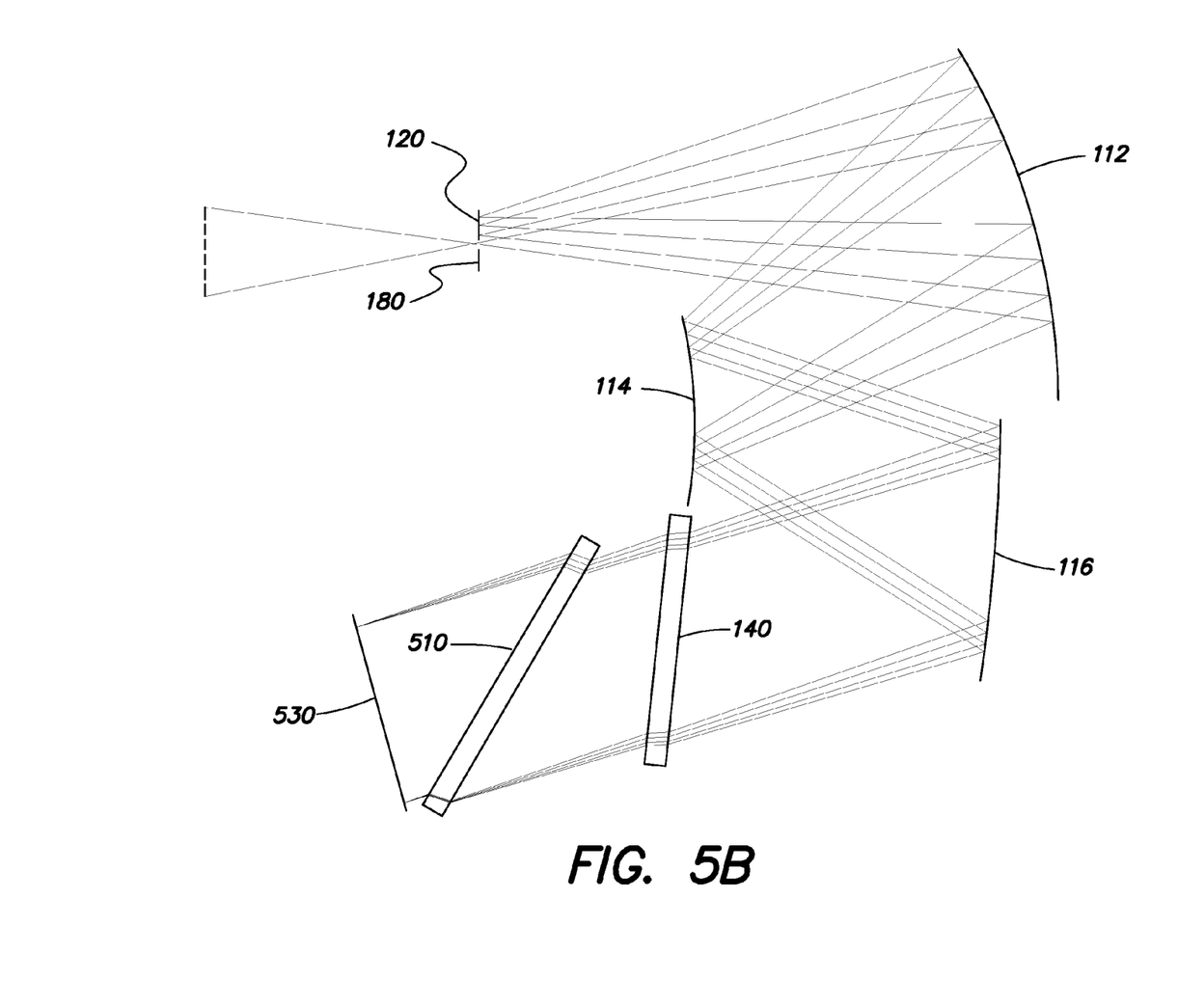
FIG. 5B is a ray trace illustrating only the third channel of the imaging spectrometer of FIG. 5A.

The example illustrated in FIGS. 5A and 5B does not include fold minors; however, those skilled in the art will appreciate, given the benefit of this disclosure, that one or more fold minors may be used to redirect any of the electromagnetic radiation to the dispersive elements 150, 160 and 530 to accommodate various arrangements and positioning of the beamsplitters 140, 510 and the dispersive elements.

While some embodiments use a single entrance slit, as discussed above, other embodiments of the spectrometer may be integrated into a dual-band or multi-band system with two or more entrance slits, such as the system disclosed in U.S. Pat. No. 7,382,498, for example. In such an embodiment, each entrance slit may direct electromagnetic radiation to two or more diffraction gratings.

Figure 6:
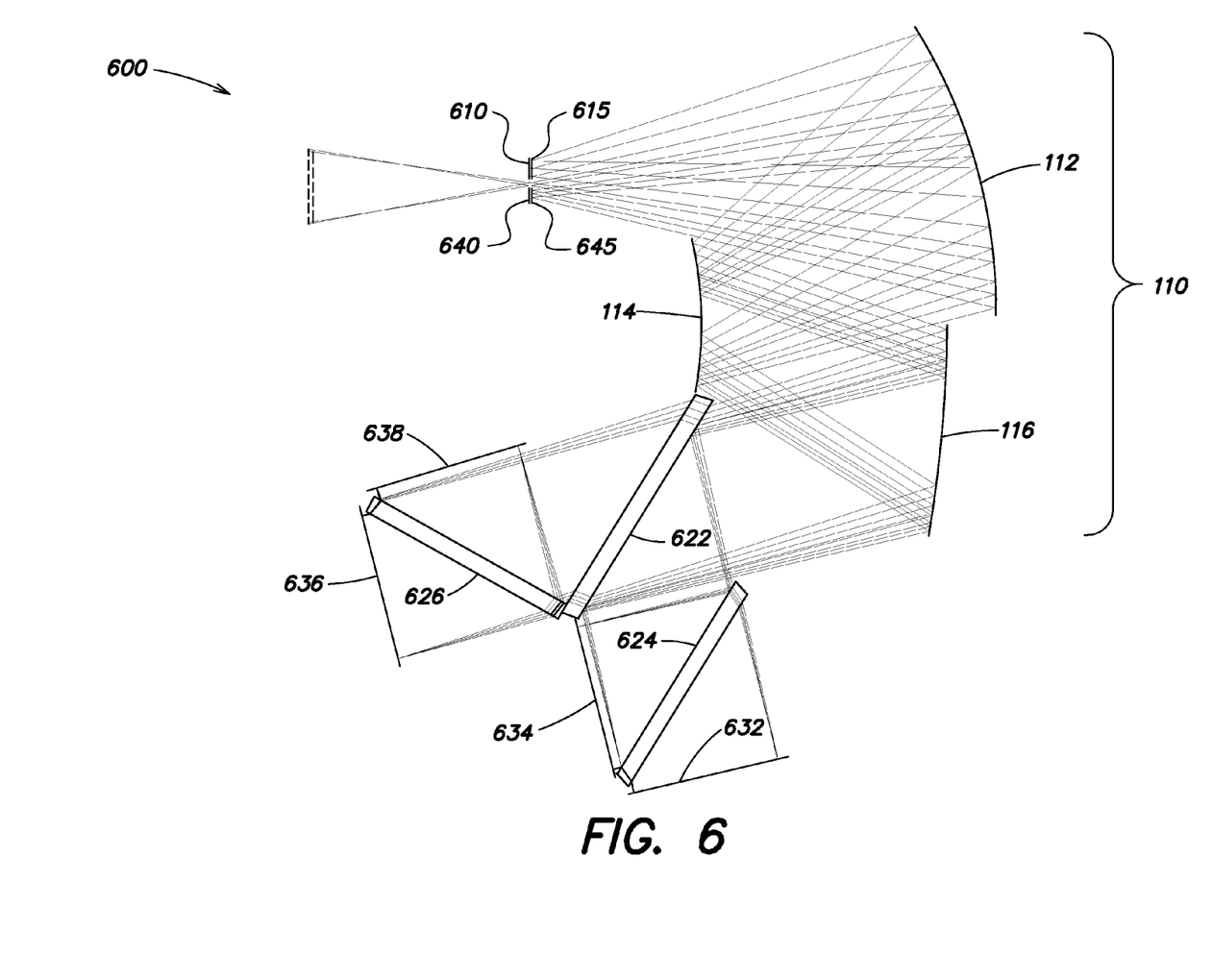
FIG. 6 is a ray trace of one example of a four channel imaging spectrometer according to aspects of the invention.

Referring to FIG. 6 there is illustrated a ray trace of one example of a four channel imaging spectrometer 600 including two slits, four dispersive elements (e.g., diffraction gratings) and two imaging detectors (e.g., focal plane arrays). In this example, the reflective triplet 110 is shared among all four channels of the imaging spectrometer 600. Incident electromagnetic radiation is transmitted to the reflective triplet 110 through one of entrance slits 610, 615. As discussed above, the reflective triplet 110 collimates the incoming electromagnetic radiation received via the entrance slits 610, 615 and provides a collimated reflective triplet output beam at a first dichroic beamsplitter 622. The first dichroic beamsplitter 622 splits the reflective triplet output beam into two parts, each of which is directed to a further beamsplitter. For example, electromagnetic radiation a first wavelength range reflected by the first beamsplitter 622 is directed to a second beamsplitter 624 which splits the electromagnetic radiation into a first channel incident on a first reflective dispersive element 632, and a second channel incident on a second reflective dispersive element 634. Similarly, electromagnetic radiation a second wavelength range passed by the first beamsplitter 622 is directed to a third beamsplitter 626 which splits the electromagnetic radiation into a third channel incident on a third reflective dispersive element 636, and a fourth channel incident on a fourth reflective dispersive element 638. The dispersive elements 632, 634, 636 and 638 disperse the electromagnetic radiation in their respective channels to produce dispersed outputs which, as discussed above, are recombined by the beamsplitters 622, 624 and 626 and redirected back through the reflective triplet 110 to be incident on image sensors 640, 645 located in plane with the entrance slits 610, 615, as illustrated in FIG. 6. Thus, a compact, efficient multi-channel imaging spectrometer may be provided.

As in above-discussed embodiments, the dispersive elements 632, 634, 636 and 638 may be diffraction gratings or prisms, for example. Furthermore, while the example illustrated in FIG. 6 does not include fold mirrors, those skilled in the art will appreciate, given the benefit of this disclosure, that one or more fold minors may be used to redirect any of the electromagnetic radiation to the dispersive elements 632, 634, 636 and 638 to accommodate various arrangements and positioning of the beamsplitters 622, 624 and 636 and the dispersive elements.

In some embodiments, the spectrometer 100 or 500 may have a wide field of view that exceeds imaging on a single image sensor 200. Accordingly, in another embodiment, the spectrometer 100, 500 may be combined with embodiments of the "gap filler" image plane assembly disclosed in co-pending, commonly-owned U.S. patent application Ser. No. 13/191,782 filed on Jul. 27, 2011 and titled "LOW DISTORTION SPECTROMETER" which is incorporated herein by reference in its entirety, to provide ultra-high signal to noise ratio over a very wide field of view. For example, in one embodiment, the image plane assembly described in detail in U.S. patent application Ser. No. 13/191,782 may be accommodated at the slit 120/focal plane 180 of the spectrometer.

According to another embodiment, the entrance slit 120 of the spectrometer 100 may be configured to appear to have different dimensions as a function of wavelength. For example, the slit 120 may appear to be approximately 20 μm in length for the VNIR-SWIR spectral band, and may appear to be approximately 40 μm in length for the LWIR spectral band. This apparent change in width may be accomplished by using coatings on the slit substrate, or through careful choice of the dielectric material used for the slit substrate.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multi-channel imaging spectrometer comprising:
a double pass reflective triplet optical subsystem configured to receive and collimate incident electromagnetic radiation and to provide a collimated output beam;
a single entrance slit configured to direct the incident electromagnetic radiation to the reflective triplet;
a first beamsplitter configured to receive the collimated output beam from the reflective triplet and to separate the collimated output beam into a first spectral channel and a remaining wavelength range;
a second beamsplitter optically coupled to the first beamsplitter and configured to receive the remaining wavelength range from the first beamsplitter and to separate the remaining wavelength range into a second spectral channel and a third spectral channel; and
at least three dispersive elements, each configured to receive and spectrally disperse a respective one of the first, second, and third spectral channels to provide corresponding first, second, and third dispersive outputs, wherein the first and second beamsplitters are configured to recombine the first, second, and third dispersed outputs into a combined dispersed output, and the reflective triplet is further configured to focus the combined dispersed output onto a focal plane co-located with entrance slit; and
a first image sensor positioned at the focal plane and configured to produce an image from the combined dispersed output.

2. The multi-channel imaging spectrometer of claim 1, wherein the reflective triplet includes:
a primary objective mirror of positive optical power configured to receive the incident electromagnetic radiation from the entrance slit and to focus the first and second dispersed outputs onto the focal plane;
a secondary objective mirror of negative optical power optically coupled to the primary objective mirror; and
a tertiary objective mirror of positive optical power optically coupled to the secondary objective mirror and to the first beamsplitter.

3. The multi-channel imaging spectrometer of claim 1, wherein the first, second and third dispersive elements are diffraction gratings.

4. The multi-channel imaging spectrometer of claim 1, further comprising:
a third beamsplitter optically coupled to the second beamsplitter and configured to receive and separate the third spectral channel to provide a fourth spectral channel; and
a fourth dispersive element configured to receive and spectrally disperse the fourth spectral channel to provide a fourth dispersed output;
wherein the first, second, and third beamsplitters are further configured to recombine the first, second, third, and fourth dispersed outputs to provide the combined dispersed output.

5. A multi-channel imaging spectrometer comprising:
a double pass reflective triplet configured to receive and collimate incident electromagnetic radiation in a spectral band of interest and to provide a collimated output beam, the spectral band of interest including a first spectral sub-band and a second spectral sub-band;
a single entrance slit configured to direct the incident electromagnetic radiation including both the first and second spectral sub-bands to the reflective triplet;
a beamsplitter configured to receive the collimated output beam from the reflective triplet and to separate the collimated output beam into at least the first spectral sub-band and the second spectral sub-band;

a first dispersive element configured to receive and spectrally disperse the first spectral sub-band to provide a first dispersed output;

a second dispersive element configured to receive and spectrally disperse the second spectral sub-band to provide a second dispersed output, the beamsplitter further configured to recombine the first and second dispersed outputs to provide a combined dispersed output, and the reflective triplet further configured to focus the combined dispersed output onto a single focal plane co-located with the entrance slit; and a single image sensor located at the focal plane and configured to receive the combined dispersed output from the double-pass reflective triplet and to produce an image from the combined dispersed output, and wherein dispersion of the first and second spectral sub-bands by the first and second dispersive elements, respectively, and recombination of first and second dispersed outputs to provide the combined dispersed output occur in collimated space.

6. The multi-channel imaging spectrometer of claim 5, wherein the reflective triplet includes:

a primary objective mirror of positive optical power configured to receive the incident electromagnetic radiation from the entrance slit, and to focus the first, and second dispersed outputs onto the focal plane;

a secondary objective minor of negative optical power optically coupled to the primary objective mirror; and a tertiary objective minor of positive optical power optically coupled to the secondary objective minor and to the beamsplitter.

7. The multi-channel imaging spectrometer of claim 5, wherein the image sensor is a single focal plane array detector having a first active area sensitive to the first dispersed output and a second active area sensitive to the second dispersed output.

8. The multi-channel imaging spectrometer of claim 7, wherein the. first and second active areas are spatially separated from one another by a guard band.

9. The multi-channel imaging spectrometer of claim 7, wherein the spectral band of interest includes a wavelength range of approximately 0.4 μm to 2.5 μm.

10. The multi-channel imaging spectrometer of claim 5, further comprising a fold minor optically positioned between the beamsplitter and the second dispersive element and configured to direct the second spectral sub-band from the beamsplitter to the second dispersive element.

11. The multi-channel imaging spectrometer of claim 5, wherein the first and second dispersive elements are first and second diffraction gratings, each with a single blaze angle.

12. A spectroscopy method comprising:

directing electromagnetic radiation in a spectral band of interest through a single entrance slit to a reflective optical system, the electromagnetic radiation including wavelengths in a first sub-band of the spectral band of interest and wavelengths in a second sub-band of the spectral band of interest;

collimating the electromagnetic radiation received via the entrance slit using the reflective optical system to provide a collimated output beam;

spectrally splitting the collimated output beam into the first sub-band and the second sub-band using a dichroic beamsplitter;

spectrally dispersing the first sub-band using a first reflective dispersive element to provide a first dispersed output;

spectrally dispersing the second sub-band using a second reflective dispersive element to provide a second dispersed output;

recombining the first and second dispersed outputs using the dichroic beamsplitter to provide a combined dispersed output;

focusing the combined dispersed output via the reflective optical system onto a single focal plane co-located with the entrance slit; and imaging the combined dispersed output using a single image sensor to produce an image at the focal plane from the first and second dispersed outputs.

13. The method of claim 12, wherein the first and second sub-bands are contiguous or closely spaced relative to one another.

14. The method of claim 12, further comprising:

selecting the first reflective dispersive element having a blaze angle tuned to maximize diffraction efficiency for the first sub-band; and selecting the second reflective dispersive element having a Haze angle tuned to maximize diffraction efficiency for the second sub-band.

15. The multi-channel imaging spectrometer of claim 11, wherein the blaze angles of each of the first and second dispersive elements are tuned to maximize diffraction efficiency for the first and second spectral sub-bands, respectively.

16. The multi-channel imaging spectrometer of claim 9, wherein the beamsplitter is a dichroic beamsplitter centered at approximately 1.4 μm.

* * * * *

UNITED STATES PATENT AND TRADEMARK OFFICE
CERTIFICATE OF CORRECTION

PATENT NO. : 9,291,501 B2
APPLICATION NO. : 13/558785
DATED : March 22, 2016
INVENTOR(S) : Ian S. Robinson et al.

It is certified that error appears in the above-identified patent and that said Letters Patent is hereby corrected as shown below:

In the Specification:
At column 1, line number 20, delete "minor" and replace with --mirror--.
At column 2, line number 15, delete "minor" and replace with --mirror--.
At column 2, line number 18, delete "minor" and replace with --mirror--.
At column 2, line number 20, delete "minor" and replace with --mirror--.
At column 2, line number 22, delete "minor" and replace with --mirror--.
At column 3, line number 42, delete "minor" and replace with --mirror--.
At column 3, line number 44, delete "minor" and replace with --mirror--.
At column 3, line number 46, delete "minor" and replace with --mirror--.
At column 3, line number 57, delete "minor" and replace with --mirror--.
At column 6, line number 37, delete "minor" and replace with --mirror--.
At column 6, line number 38, delete "minor" and replace with --mirror--.
At column 6, line number 39, delete "minor" and replace with --mirror--.
At column 6, line number 40, delete "minor" and replace with --mirror--.
At column 6, line number 42, delete "minor" and replace with --mirror--.
At column 6, line number 43, delete "minor" and replace with --mirror--.
At column 10, line number 45, delete "minor" and replace with --mirror--.
At column 10, line number 47, delete "minor" and replace with --mirror--.
At column 11, line number 31, delete "minor" and replace with --mirror--.

In the Claims:
At column 13, line number 29, claim number 6, delete "minor" and replace with --mirror--.
At column 13, line number 32, claim number 6, delete "minor" and replace with --mirror--.
At column 13, line number 33, claim number 6, delete "minor" and replace with --mirror--.
At column 13, line number 47, claim number 10, delete "minor" and replace with --mirror--.
At column 14, line number 39, claim number 14, delete "Haze" and replace with --blaze--.

Signed and Sealed this
Nineteenth Day of July, 2016

Michelle K. Lee
*Director of the United States Patent and Trademark Office*